(12) United States Patent
Liu et al.

(10) Patent No.: US 11,831,256 B2
(45) Date of Patent: Nov. 28, 2023

(54) SHORT-TRAVEL NANOSCALE MOTION STAGE AND METHOD FOR MEASURING THERMALLY-RELATED HYSTERESIS DATA

(71) Applicant: Harbin Institute of Technology, Harbin (CN)

(72) Inventors: Yang Liu, Harbin (CN); Qian Miao, Harbin (CN); Ning Cui, Harbin (CN)

(73) Assignee: Harbin Institute of Technology, Harbin (CN)

( * ) Notice: Subject to any disclaimer, the term of this patent is extended or adjusted under 35 U.S.C. 154(b) by 47 days.

(21) Appl. No.: 17/676,888

(22) Filed: Feb. 22, 2022

(65) Prior Publication Data

US 2022/0271688 A1 Aug. 25, 2022

(30) Foreign Application Priority Data

Feb. 25, 2021 (CN) .......................... 202110213939.6

(51) Int. Cl.
| | |
|---|---|
| *H02N 2/06* | (2006.01) |
| *G01D 5/14* | (2006.01) |
| *G01D 5/20* | (2006.01) |
| *G05D 23/19* | (2006.01) |
| *H02N 2/02* | (2006.01) |

(52) U.S. Cl.
CPC ............. *H02N 2/062* (2013.01); *G01D 5/142* (2013.01); *G01D 5/20* (2013.01); *G05D 23/1917* (2013.01); *H02N 2/023* (2013.01)

(58) Field of Classification Search
CPC ........ H02N 2/062; H02N 2/023; G01D 5/142; G01D 5/20; G01D 23/1917; G01D 21/02; F16M 11/043; F16M 11/08; F16M 11/16; F16M 11/18
See application file for complete search history.

(56) References Cited

U.S. PATENT DOCUMENTS

| | | | |
|---|---|---|---|
| 8,260,393 B2 | 9/2012 | Kamath et al. | |
| 9,282,925 B2 | 3/2016 | Mahlingam et al. | |
| 9,717,449 B2 | 8/2017 | Kamath et al. | |
| 10,520,339 B2 * | 12/2019 | Lou | F16M 11/121 |

* cited by examiner

*Primary Examiner* — Emily P Pham
(74) *Attorney, Agent, or Firm* — True Shepherd LLC; Andrew C. Cheng (57) ABSTRACT

A short-travel nanoscale motion stage and a method for measuring thermally-related hysteresis data are provided. A stator unit of a left two-pole electromagnet and stator units of two inchworm motors are fixed on a right side surface of a left foundation frame, and an active unit of the left two-pole electromagnet and actives of the two inchworm motors are fixed on a left side surface of a stage moving component. An active unit of a right two-pole electromagnet is fixed on a right side surface of the stage moving component, while a stator unit of the right two-pole electromagnet is fixed on a left side surface of a right foundation frame. The stage moving component is fixedly mounted on a guide sleeve of an aerostatic guideway. Each of the stator units of the left and right two-pole electromagnets has an eddy current sensor and a hall sensor fixed therein.

7 Claims, 7 Drawing Sheets

SHORT-TRAVEL NANOSCALE MOTION STAGE AND METHOD FOR MEASURING THERMALLY-RELATED HYSTERESIS DATA

CROSS-REFERENCE TO RELATED APPLICATIONS

This application claims priority to Chinese Patent Application No. 202110213939.6 with a filing date of Feb. 25, 2021. The content of the aforementioned application, including any intervening amendments thereto, is incorporated herein by reference.

TECHNICAL FIELD

The present disclosure belongs to the technical field of high-end equipment, and in particular, to a short-travel nanoscale motion stage and a method for measuring thermally-related hysteresis data.

BACKGROUND ART

Lorentz-force-driven motors have been extensively used in high-precision positioning stage at present for their characteristics of simple structure, small size, stable force output, high linearity, etc. However, with the growing productivity of next generation high-end equipment, increasing requirements of high velocity, high acceleration and high precision have been proposed on motion stage. Unfortunately, with a limited spatial size, the power density of a Lorentz-force-driven motor may have been close to its physical limit. On the one hand, large force output may result in increased size and weight of a motor, thus failing to meet the spatial constraint condition of a nanoscale motion stage; on the other hand, heavy current may result in increased copper loss of a Lorentz-force-driven motor, rendering the heat dissipation problem difficult to solve. These problems are particularly outstanding in short-travel motion stage. Therefore, to meet the increasing requirement of a high-precision positioning system of high-end equipment on high acceleration, there is provided a short-travel nanoscale motion stage.

The establishment and compensation of a hysteresis model are the core parts of control of the motion stage, and the accuracy of the model is closely related to the control precision of the stage. Data measurement is the basis of modeling and may directly determine the accuracy of modeling.

Existing data measurement methods involved in the description of the hysteresis characteristic are mainly applied to measure basic hysteresis loops of hysteresis materials. Patent No. 201610212992.3 describes a method for measuring a basic hysteresis loop of a soft magnetic material by using a measuring device, in which the basic hysteresis loop and various corresponding hysteresis parameters are described comprehensively. Patent No. 201910450042.8 describes a method for measuring a hysteresis loop of a magnetic core material and also provides a device for measuring a hysteresis loop of a magnetic core material that can measure a set of ultimate hysteresis loops of a magnetic component and obtain a magnetization curve of the measured magnetic component. The two methods can measure the magnetic conductivity of a ferromagnetic material at a fixed temperature, but cannot obtain a relationship between energizing current and attractive force when an electromagnet air gap and a coil temperature change. Patent No. 201920577534.9 describes a tester for characteristics of a magnetic material that can obtain magnetization curves of the magnetic material at different temperatures and a changing relationship of a hysteresis loop with frequency and amplitude. This patent takes into account the influence of the temperature characteristic on the magnetic conductivity without consideration of the influence of an air gap on the attractive force of an electromagnet, and cannot characterize the thermally-related dynamic force output hysteresis characteristic of an actuator of the motion stage provided in this patent.

SUMMARY

A first objective of the present disclosure is to provide a short-travel nanoscale motion stage to solve the existing problems in the field of micro-nano positioning stages, i.e., Lorentz-force-driven motors having insufficient power density to meet the requirement of high acceleration and thus affecting the productivity of equipment.

A second objective of the present disclosure is to provide a method for measuring thermally-related hysteresis data of a short-travel nanoscale motion stage. This method can accurately obtain the data of coil temperature, control current and actuator (two-pole electromagnet) force output in the working process of the motion stage to provide technical support for establishing a dynamic force output hysteresis characteristic model of the actuator.

According to the present disclosure, related data about the influences of conditions such as displacement, control current and temperature on actuator force output in the working process of the motion stage can be obtained accurately to lay the foundation for high precision control of the motion stage.

To achieve the above objectives, the present disclosure adopts the following technical solutions:

A short-travel nanoscale motion stage including two foundation frames, a stage moving component, two inchworm motors, two two-pole electromagnets, two measuring systems, and an aerostatic guideway. The two foundation frames refer to a left foundation frame and a right foundation frame. The two two-pole electromagnets refer to a left two-pole electromagnet and a right two-pole electromagnet. Each of the two measuring systems includes an eddy current sensor and a hall sensor.

A stator unit of the left two-pole electromagnet and stator units of the two inchworm motors are fixed on a right side surface of the left foundation frame, and an active unit of the left two-pole electromagnet and actives of the two inchworm motors are fixed on a left side surface of the stage moving component. An active unit of the right two-pole electromagnet is fixed on a right side surface of the stage moving component, while a stator unit of the right two-pole electromagnet is fixed on a left side surface of the right foundation frame. The stage moving component is fixedly mounted on a guide sleeve of the aerostatic guideway, and the stage moving component is guided by a guide spindle of the aerostatic guideway to move at degrees of freedom along X and Rz axes. Each of the stator unit of the left two-pole electromagnet and the stator unit of the right two-pole electromagnet has an eddy current sensor and a hall sensor fixed therein to measure the magnetic flux of the two-pole electromagnet and the displacement of the stage moving component at degrees of freedom along the X and Rz axes.

A method for measuring thermally-related hysteresis data of a short-travel nanoscale motion stage includes the following steps:

step 1, temperature setting: giving an instruction by the upper computer and setting the temperature of the coils of the two-pole electromagnets by the temperature controller;

step 2, displacing: energizing the two inchworm motors to move the stage moving component to a desired position through the motion controller and the first power amplifier;

step 3, fixing by the fixture: fixing the stage moving component at the desired position reached in step 2 by using the fixture;

step 4, data acquisition: giving an instruction by the upper computer, controlling, by the motion controller, the current of the coils of the two two-pole electromagnets to change at different frequencies and amplitudes, and measuring, by the force sensor, attractive forces of the two-pole electromagnets under corresponding conditions; acquiring, by the signal acquisition board, data involved in this process and transferring the data to the upper computer for storage; and monitoring and adjusting an operating temperature of the short-travel nanoscale motion stage through the temperature controller coordinating with the water cooling systems in this process, ensuring that the temperature of the motion stage is maintained at a set value in a motion process;

step 5, data computing: labeling and storing the acquired data by the upper computer to obtain a set of measurement results; and step 6, repeating the steps 1 to 5 to complete current-force data acquisition under different temperature and displacement conditions in the motion process of the motion stage, and finally tabulating the data.

Compared with the prior art, the present disclosure has the following beneficial effects:

1. According to the present disclosure, inchworm motors and two-pole electromagnets are used in combination to drive the motion stage. Thus, the advantage of large force output of the electromagnets and the characteristics of high resolution and high-frequency response force output of the inchworm motors can be brought into full play, allowing the motion stage to exhibit both high acceleration and high positioning precision. Accordingly, a macro-micro composite stage structure can be used in equipment to achieve motion performance indicators of high velocity, high acceleration and high positioning precision (the acceleration may be up to 128 m/s$^2$, the velocity may be up to 32 m/s, and the precision may be up to 1 nm). In addition, the motion stage of the present disclosure can rotate around the Z axis and can realize power failure self-locking, and therefore, the safety of a workpiece during high-end manufacturing can be improved.

2. The method of the present disclosure is directed to acquire nonlinear data of dynamic force output hysteresis of actuators under the action of thermo-electro-magnetic multi-field coupling. The influences of conditions such as displacement, control current and temperature on actuator force output in the working process of the motion stage can be described accurately, and a hysteresis model for the stage moving component in the motion process can be established accurately to lay the foundation for high precision control of the motion stage.

Components and respective reference numerals involved throughout the drawings are listed below:

1—left foundation frame, 2—stator unit of inchworm motor, 3—active of inchworm motor, 4—stage moving component, 5—active unit of right two-pole electromagnet, 6—stator unit of right two-pole electromagnet, 7—right foundation frame, 8—aerostatic guideway, 9—guide sleeve of aerostatic guideway 8, 10—active unit of left two-pole electromagnet, 11—stator unit of left two-pole electromagnet, 12-1—cooling liquid inlet/outlet opening, 12-2—water-cooled plate, 13—guide spindle of aerostatic guideway, 14—upper computer, 15—data bus, 16—motion controller, 17—first power amplifier, 18—second power amplifier, 19—temperature controller, 20—signal acquisition board, 21—fixture, and 22—force sensor 30—left two-pole electromagnet, 40—right two-pole electromagnet, 50—hall sensor and 60—eddy current sensor.

DETAILED DESCRIPTION OF THE EMBODIMENTS

The specific structure, mechanism and working process of the present disclosure will be further described below in detail with reference to the accompanying drawings.

Specific embodiment 1: as shown in FIG. 1 to FIG. 4, the present embodiment discloses a short-travel nanoscale motion stage including two foundation frames, a stage moving component 4, two inchworm motors, two two-pole electromagnets, two measuring systems, and an aerostatic guideway 8. The two foundation frames refer to a left foundation frame 1 and a right foundation frame 7. The two two-pole electromagnets refer to a left two-pole electromagnet 30 and a right two-pole electromagnet 40. Each of the two measuring systems includes an eddy current sensor 60 and a hall sensor 50.

A stator unit 11 of the left two-pole electromagnet and stator units 2 of the two inchworm motors are fixed on a right side surface of the left foundation frame 1, and an active unit 10 of the left two-pole electromagnet and actives 3 of the two inchworm motors are fixed on a left side surface of the stage moving component 4. An active unit 5 of the right two-pole electromagnet is fixed on a right side surface of the stage moving component 4, while a stator unit 6 of the right two-pole electromagnet is fixed on a left side surface of the right foundation frame 7. The stage moving component 4 is fixedly mounted on a guide sleeve 9 of the aerostatic guideway, and the stage moving component 4 is guided by a guide spindle 13 of the aerostatic guideway to move at degrees of freedom along X and Rz axes. Each of the stator unit 11 of the left two-pole electromagnet and the stator unit 6 of the right two-pole electromagnet has an eddy current sensor and a hall sensor fixed therein to measure the magnetic flux of the two-pole electromagnet and the displacement of the stage moving component 4 at degrees of freedom along the X and Rz axes.

The two two-pole electromagnets have the same structure and exhibit the same performance. In the working process, the two two-pole electromagnets are orderly energized to sequentially produce attractive forces between the stator units and the active units of the two-pole electromagnets, ensuring a high acceleration of the nanoscale motion stage. The magnitude of current and energizing timing of two coils are adjusted such that the two two-pole electromagnets produce asymmetric forces to provide a large torque.

The two inchworm motors have the same structure and exhibit the same performance to ensure the precision and the fast response characteristic of the nanoscale motion stage in the motion process and can realize power failure self-locking of the stage moving component 4.

The left foundation frame 1 serves as a mounting carrier for the stator unit 11 of the left two-pole electromagnet and the stator units 2 of the two inchworm motors.

The right foundation frame 7 serves as a mounting carrier for the stator unit 6 of the right two-pole electromagnet and a fixture 21.

Each of the stator units of the two two-pole electromagnets includes an electromagnet stator, a coil, and an electromagnet stator housing, with the coil being mounted on the electromagnet stator and encapsulated in the electromagnet stator housing (as done in the prior art).

Each of the active units of the two two-pole electromagnets includes an electromagnet active housing and an electromagnet active, with the electromagnet active being encapsulated in the electromagnet active housing (as done in the prior art).

Each of the stator units 2 of the two inchworm motors includes piezoelectric ceramic feet and an inchworm motor stator housing, with the piezoelectric ceramic feet being mounted on an inner side surface of the inchworm motor stator housing (as done in the prior art).

The stage moving component 4 serves as a mounting carrier for the active units of the two two-pole electromagnets and the actives of the two inchworm motors.

The active unit 10 of the left two-pole electromagnet and the actives 3 of the two inchworm motors are mounted opposite to the stator unit 11 of the left two-pole electromagnet and the stator units 2 of the two inchworm motors that are fixed to the left foundation frame 1.

The stator unit 6 of the right two-pole electromagnet is fixed at the central position of the left side surface of the right foundation frame 7 and mounted opposite to the active unit 5 of the right two-pole electromagnet that is fixed on the right side surface of the stage moving component 4.

Figure 3:
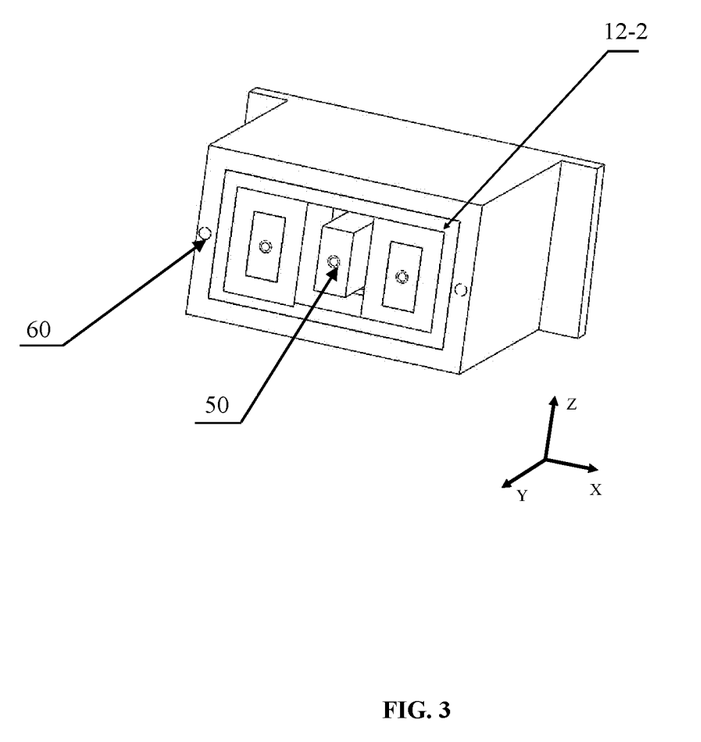
FIG. 3 is a schematic diagram of assembly of a stator unit of a two-pole electromagnet, a water cooling system and a measurement system in a short-travel nanoscale motion stage according to the present disclosure.

The measuring systems use the eddy current sensors to perform displacement measurement along the X axis and use the hall sensors to perform magnetic flux measurement at different displacements.

The aerostatic guideway provides non-contact frictionless guidance. Also, magnetic suspension or gas-magnetic composite high-precision guide mechanisms can be used to guide the stage moving component 4 to move along the X axis.

Figure 1:
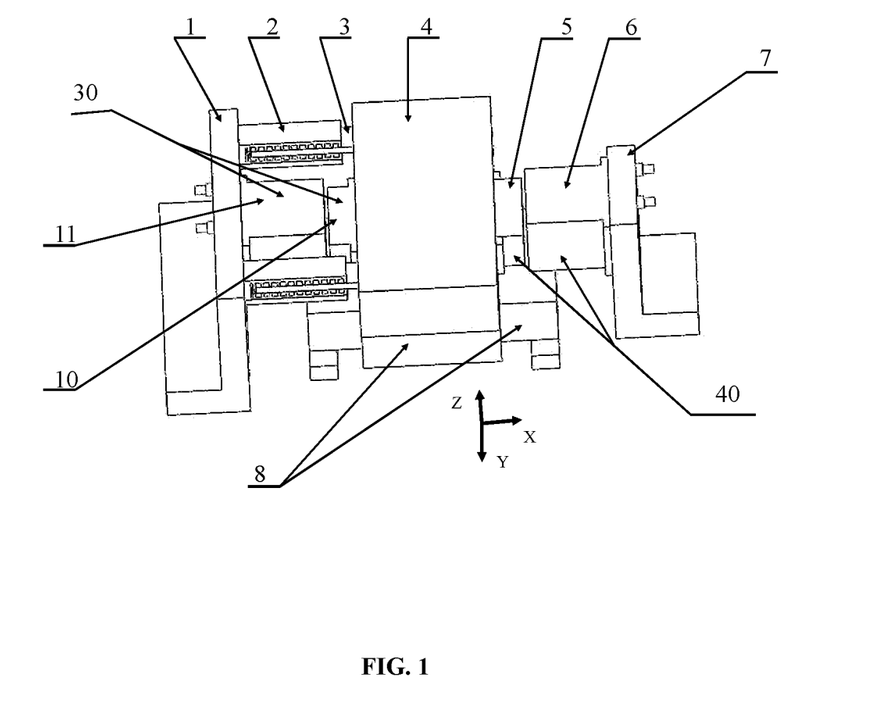
FIG. 1 is a structure diagram of a short-travel nanoscale motion stage according to the present disclosure.

Specific embodiment 2: as shown in FIG. 1 and FIG. 3, the present embodiment provides further description for the specific embodiment 1. The short-travel nanoscale motion stage further includes two water cooling systems. Each of the two water cooling systems includes a water cooler, a cooling liquid inlet/outlet opening 12-1 and a water-cooled plate 12-2. The cooling liquid inlet/outlet opening 12-1 is formed in each of the left foundation frame 1 and the right foundation frame 7. The water-cooled plates 12-2 are arranged on four sides within the electromagnet stator housings of the two two-pole electromagnets. Each cooling liquid inlet/outlet opening 12-1 is communicated with the corresponding electromagnet stator housing, and each water cooler is communicated with the corresponding cooling liquid inlet/outlet opening 12-1. The coils are cooled to maintain the operating temperature of the coils, thereby improving the robustness of the magnetic conductivity to environmental changes, guaranteeing the stability of the force output performance of the electromagnets and reducing the control difficulty of the stage.

Figure 2:
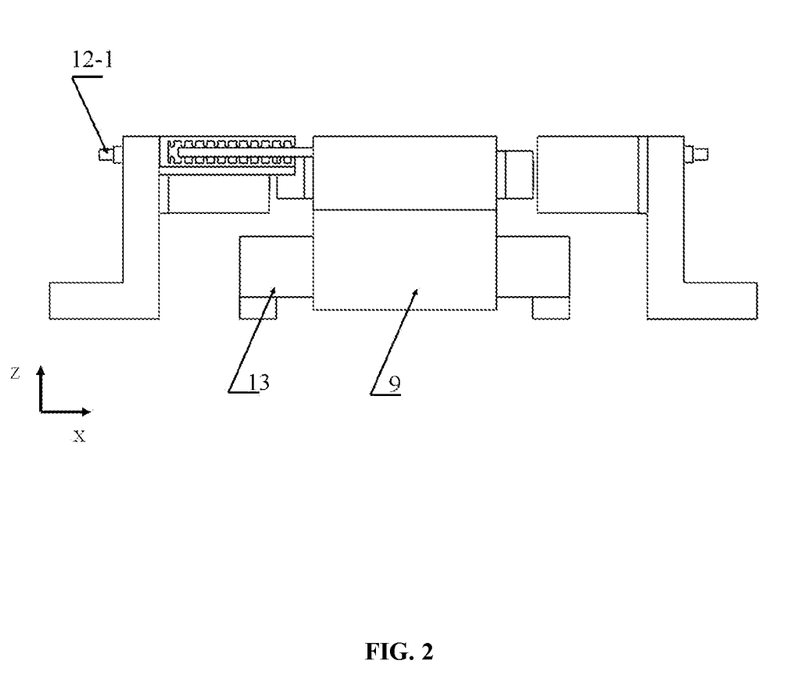
FIG. 2 is a front view of a short-travel nanoscale motion stage according to the present disclosure.
Figure 4:
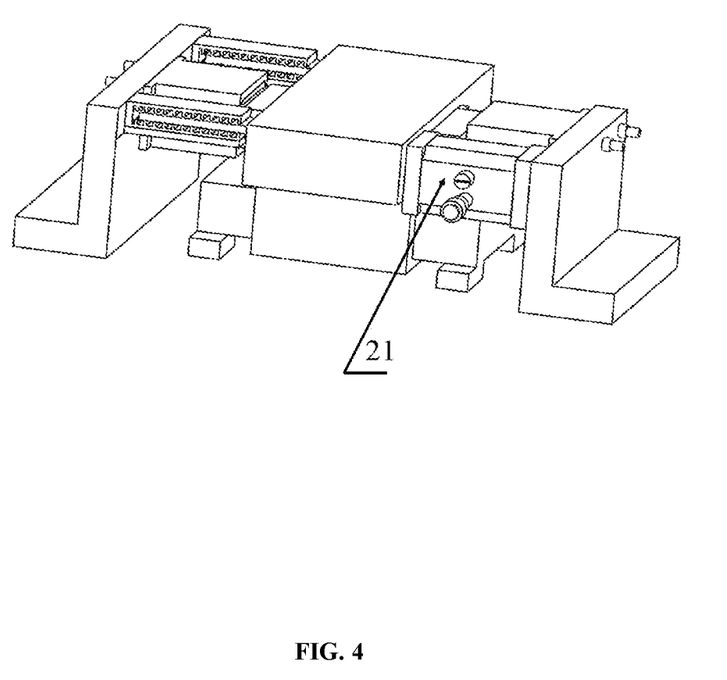
FIG. 4 is an axonometric view of a short-travel nanoscale motion stage according to the present disclosure.

Specific embodiment 3: as shown in FIG. 1, FIG. 2 and FIG. 4, the present embodiment provides further description for the specific embodiment 1. The stator unit 11 of the left two-pole electromagnet is fixed at a central position of the right side surface of the left foundation frame 1, and the stator units 2 of the two inchworm motors are fixed at front and rear sides of the right side surface of the left foundation frame 1 and distributed symmetrically about the stator unit 11 of the left two-pole electromagnet.

Specific embodiment 4, as shown in FIG. 1, FIG. 2 and FIG. 4, the present embodiment provides further description for the specific embodiment 1 or 3. The active unit 10 of the left two-pole electromagnet and the active unit 5 of the right two-pole electromagnet are fixed at central positions of the left and right side surfaces of the stage moving component 4, and the actives 3 of the two inchworm motors are fixed at front and rear sides of the left side surface of the stage moving component 4 and distributed symmetrically about the active unit 10 of the left two-pole electromagnet and the active unit 5 of the right two-pole electromagnet.

Figure 5:
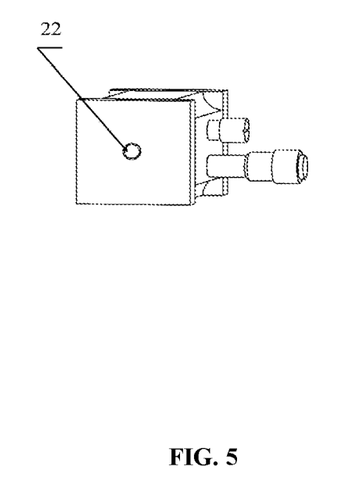
FIG. 5 is a structure diagram of a fixture of a short-travel nanoscale motion stage according to the present disclosure.

Specific embodiment 5, as shown in FIG. 1 and FIG. 5, the present embodiment provides further description for the specific embodiment 2. A fixture 21 is fixed on the left side surface of the right foundation frame 7 (the fixture 21 is a telescopically adjustable device, which is an existing component used for fixing the moving component 4 at different displacements in the data acquisition process, i.e., assisting in fixation for data acquisition of the moving component 4), and a force sensor 22 is fixed on the fixture 21.

Figure 6:
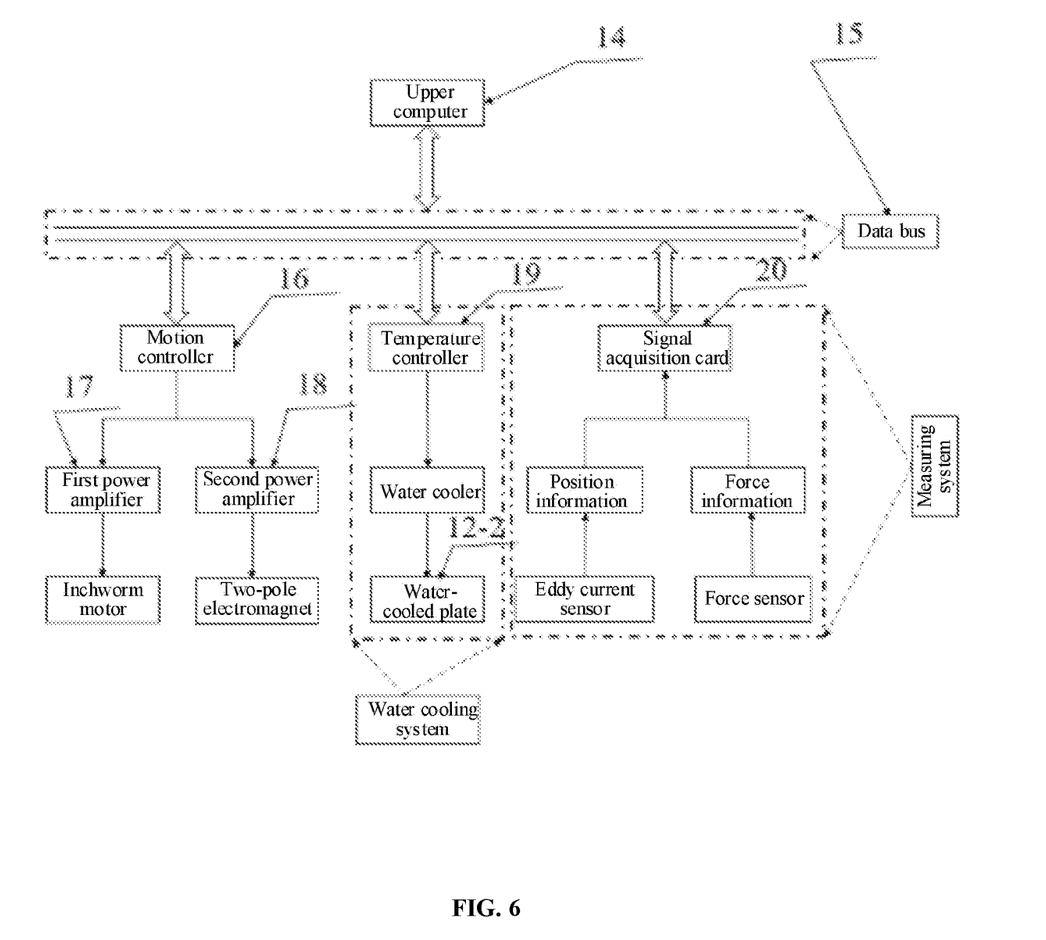
FIG. 6 is a structure diagram of an electrical control system of a short-travel nanoscale motion stage according to the present disclosure.

Specific embodiment 6: as shown in FIG. 3 and FIG. 6, the present embodiment provides further description for the specific embodiment 5. The short-travel nanoscale motion stage further includes an electrical control system. The electrical control system includes an upper computer 14, a data bus 15, a motion controller 16, a first power amplifier 17, a second power amplifier 18, a temperature controller 19, and a signal acquisition board 20.

The upper computer 14 exchanges data with the motion controller 16, the temperature controller 19 and the signal acquisition board 20 through the (VME) data bus 15 to exchange internal information in real time. The motion controller 16 controls the two inchworm motors through the first power amplifier 17. The motion controller 16 controls the two two-pole electromagnets through the second power amplifier 18. The temperature controller 19 controls the water coolers and adjusts a temperature of coils of the two-pole electromagnets through the water-cooled plates 12-2. The signal acquisition board 20 acquires and transfers position information acquired by the eddy current sensors and force information acquired by the force sensor 22, and feeds back the acquired information to the upper computer 14. The upper computer 14 performs data processing.

Figure 7:
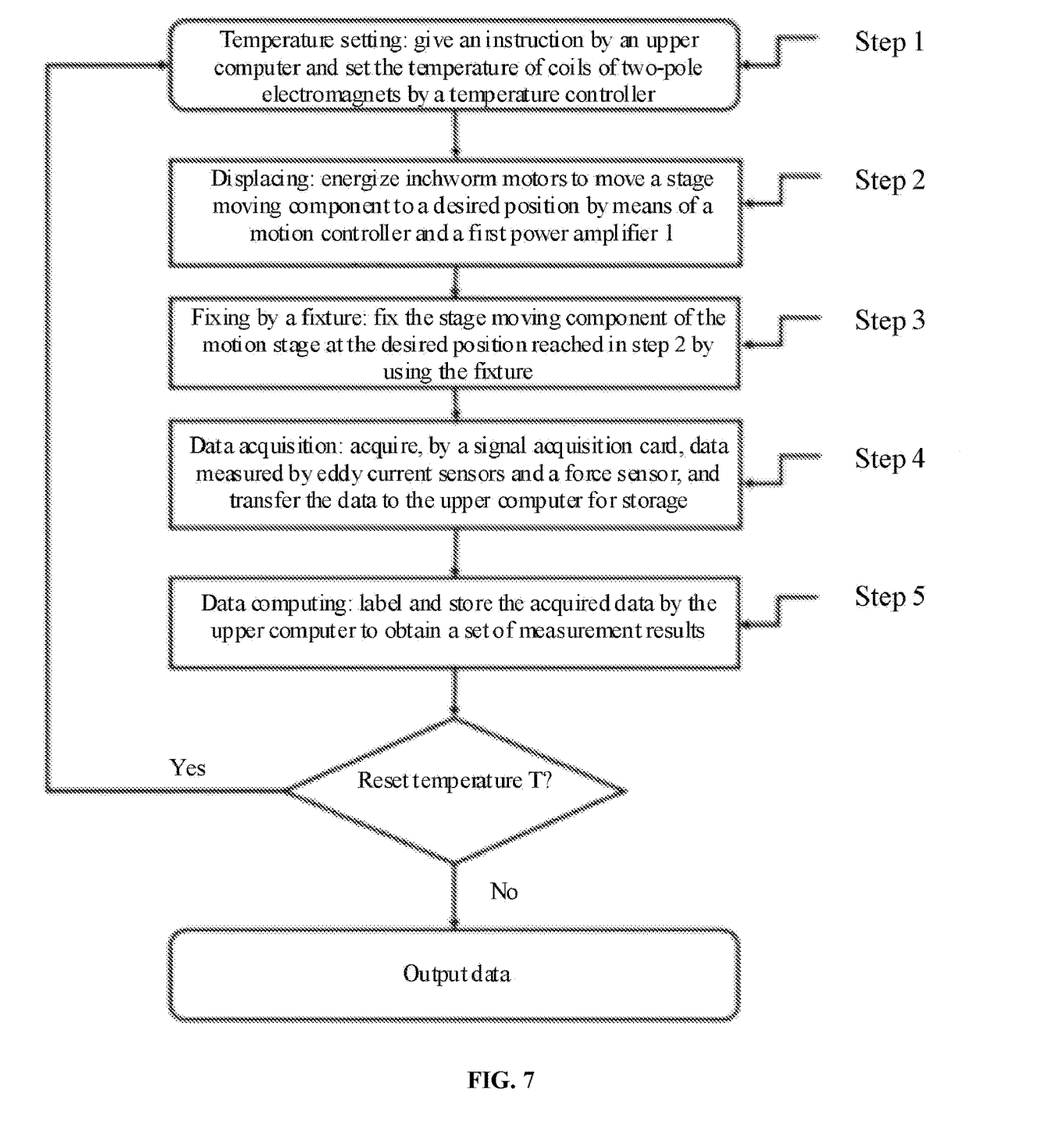
FIG. 7 is a flowchart of a method for measuring thermally-related hysteresis data of a short-travel nanoscale motion stage according to the present disclosure.

Specific embodiment 7: as shown in FIG. 7, the present embodiment discloses a method for measuring thermally-related hysteresis data of the short-travel nanoscale motion stage according to the specific embodiment 6. The method includes the following steps:

step 1, temperature setting: give an instruction by the upper computer 14 and set the temperature of the coils of the two-pole electromagnets by the temperature controller 19;

step 2, displacing: energize the two inchworm motors to move the stage moving component 4 to a desired position through the motion controller 16 and the first power amplifier 17;

step 3, fixing by the fixture 21: fix the stage moving component 4 at the desired position reached in step 2 by using the fixture 21;

step 4, data acquisition: give an instruction by the upper computer 14, control, by the motion controller 16, the current of the coils of the two two-pole electromagnets to change at different frequencies and amplitudes, and measure, by the force sensor 22, attractive forces of the two-pole electromagnets under corresponding conditions; acquire, by the signal acquisition board 20, data involved in this process and transfer the data to the upper computer 14 for storage; and monitor and adjust an operating temperature of the short-travel nanoscale motion stage through the temperature controller 19 coordinating with the water cooling systems in this process, ensuring that the temperature of the motion stage is maintained at a set value in a motion process;

step 5, data computing: label and store the acquired data by the upper computer 14 to obtain a set of measurement results; and step 6, repeat the steps 1 to 5 to complete current-force data acquisition under different temperature and displacement conditions in the motion process of the motion stage, and finally tabulate the data.

Working Principle:

In the working process, the two two-pole electromagnets are orderly energized to sequentially produce attractive forces between the stator unit 11 and the active unit 10 of the left two-pole electromagnet and between the stator unit 6 and the active unit 5 of the right two-pole electromagnet, ensuring a high acceleration of the nanoscale motion stage. The guide spindle 13 of the aerostatic guideway 8 guides, through the guide sleeve 9 of the aerostatic guideway 8, the stage moving component 4 to reciprocate along the X axis.

The short-travel nanoscale motion stage can provide a torque with asymmetric forces produced by two inchworm motors arranged at front and back and two two-pole electromagnets on the left and right to drive the motion stage to move along the Rz axis with a high acceleration and high precision. In particular, the magnitude of current and energizing timing of two coils are adjusted such that the two-pole electromagnets provide a large torque.

The foregoing is merely descriptions of the preferred embodiments of the present disclosure and not intended to limit the present disclosure in any form. Although the present disclosure has been disclosed above by the preferred embodiments, these embodiments are not intended to limit the present disclosure. Any person skilled in the art may make some changes or modifications to implement equivalent embodiments with equivalent changes by using the technical contents disclosed above without departing from the scope of the technical solution of the present disclosure. Any simple modification, equivalent change and modification made to the foregoing embodiments according to the technical essence of the present disclosure without departing from the contents of the technical solutions of the present disclosure shall fall within the scope of the technical solutions of the present disclosure.

What is claimed is:

1. A short-travel nanoscale motion stage, comprising two foundation frames, a stage moving component, two inchworm motors, two two-pole electromagnets, two measuring systems, and an aerostatic guideway wherein the two foundation frames refer to a left foundation frame and a right foundation frame; the two two-pole electromagnets refer to a left two-pole electromagnet and a right two-pole electromagnet; each of the two measuring systems comprises an eddy current sensor and a hall sensor;

a stator unit of the left two-pole electromagnet and stator units of the two inchworm motors are fixed on a right side surface of the left foundation frame, and an active unit of the left two-pole electromagnet and actives of the two inchworm motors are fixed on a left side surface of the stage moving component; an active unit of the right two-pole electromagnet is fixed on a right side surface of the stage moving component, and a stator unit of the right two-pole electromagnet is fixed on a left side surface of the right foundation frame; the stage moving component is fixedly mounted on a guide sleeve of the aerostatic guideway, and the stage moving component is guided by a guide spindle of the aerostatic guideway to move at degrees of freedom along X and Rz axes; each of the stator unit of the left two-pole electromagnet and the stator unit of the right two-pole electromagnet has-aft the eddy current sensor and the hall sensor fixed therein to measure a magnetic flux of the two-pole electromagnet and a displacement of the stage moving component at degrees of freedom along the X and Rz axes.

2. The short-travel nanoscale motion stage according to claim 1, further comprising two water cooling systems, wherein each of the two water cooling systems comprises a cooling liquid inlet/outlet opening and a water-cooled plate; the cooling liquid inlet/outlet opening is formed in each of the left foundation frame and the right foundation frame; the water-cooled plates are arranged on four sides within electromagnet stator housings of the two two-pole electromagnets; the cooling liquid inlet/outlet opening is communicated with corresponding electromagnet stator housing; and the water cooler is communicated with the corresponding cooling liquid inlet/outlet opening.

3. The short-travel nanoscale motion stage according to claim 1, wherein the stator unit of the left two-pole electromagnet is fixed at a central position of the right side surface of the left foundation frame; and the stator units of the two inchworm motors are respectively fixed at front and rear sides of the right side surface of the left foundation frame and distributed symmetrically about the stator unit of the left two-pole electromagnet.

4. The short-travel nanoscale motion stage according to claim 1, wherein the active unit of the left two-pole electromagnet and the active unit of the right two-pole electromagnet are respectively fixed at central positions of the left and right side surfaces of the stage moving component; and the actives of the two inchworm motors are respectively fixed at front and rear sides of the left side surface of the stage moving component and distributed symmetrically about the active unit of the left two-pole electromagnet and the active unit of the right two-pole electromagnet.

5. The short-travel nanoscale motion stage according to claim 2, wherein a fixture is fixed on the left side surface of the right foundation frame and a force sensor is fixed on the fixture.

6. The short-travel nanoscale motion stage according to claim 5, further comprising an electrical control system, wherein the electrical control system comprises an upper computer, a data bus, a motion controller, a first power amplifier, a second power amplifier, a temperature controller, and a signal acquisition board;

the upper computer exchanges data with the motion controller, the temperature controller and the signal acquisition board through the data bus to exchange internal information in real time; the motion controller controls the two inchworm motors through the first power amplifier; the motion controller controls the two two-pole electromagnets through the second power amplifier; the signal acquisition board acquires and transfers position information acquired by the eddy current sensors and force information acquired by the force sensor, and feeds back the acquired information to the upper computer; and the upper computer performs data processing.

7. A method for measuring thermally-related hysteresis data of the short-travel nanoscale motion stage according to claim 6, comprising:

temperature setting: giving an instruction by the upper computer and setting the temperature of the two-pole electromagnets by the temperature controller;

displacing: energizing the two inchworm motors to move the stage moving component to a desired position through the motion controller and the first power amplifier;

fixing by the fixture: fixing the stage moving component at the desired position by using the fixture;

data acquisition: giving an instruction by the upper computer, controlling, by the motion controller, the current of the coils of the two two-pole electromagnets to change at different frequencies and amplitudes, and measuring, by the force sensor, attractive forces of the two-pole electromagnets under corresponding conditions; acquiring, by the signal acquisition board, data involved in process of current changing and transferring the data to the upper computer for storage; and monitoring and adjusting an operating temperature of the motion stage through the temperature controller coordinating with the water cooling systems, ensuring that the temperature of the motion stage is maintained at a set value in a motion process;

data computing: labeling and storing the acquired data by the upper computer to obtain a set of measurement results; and repeating above steps to complete current-force data acquisition under different temperature and displacement conditions in the motion process of the motion stage, and finally tabulating the data.

* * * * *